(12) United States Patent
Braun

(10) Patent No.: US 7,121,798 B2
(45) Date of Patent: Oct. 17, 2006

(54) RADIAL FAN WHEEL FOR TRANSPORTING COOLING AIR FOR AN ELECTRIC MACHINE

(75) Inventor: Horst Braun, Stuttgart (DE)

(73) Assignee: Robert Bosch Gmbh, Stuttgart (DE)

( * ) Notice: Subject to any disclaimer, the term of this patent is extended or adjusted under 35 U.S.C. 154(b) by 107 days.

(21) Appl. No.: 10/492,319

(22) PCT Filed: Jun. 23, 2003

(86) PCT No.: PCT/DE03/02084

§ 371 (c)(1),
(2), (4) Date: Apr. 12, 2004

(87) PCT Pub. No.: WO2004/020838

PCT Pub. Date: Mar. 11, 2004

(65) Prior Publication Data

US 2005/0084378 A1    Apr. 21, 2005

(30) Foreign Application Priority Data

Aug. 23, 2002  (DE)  ............................... 102 38 753

(51) Int. Cl.
*F01D 5/14* (2006.01)
(52) U.S. Cl. ...................... 416/185; 416/203
(58) Field of Classification Search ........... 416/223 R, 416/236 R, 223 B, 203
See application file for complete search history.

(56) References Cited

U.S. PATENT DOCUMENTS

| 4,549,103 A * | 10/1985 | Shiga ..................... 310/60 R |
| 5,026,251 A | 6/1991 | Kinoshita |
| 5,763,968 A * | 6/1998 | Hayashi et al. ............. 310/51 |
| 6,841,901 B1 * | 1/2005 | Bilsing ..................... 310/62 |

FOREIGN PATENT DOCUMENTS

| DE | 12 53 402 B | 11/1967 |
| FR | 2 280 810 A | 2/1976 |
| FR | 2 811 158 A | 1/2002 |
| NL | 110 389 | 8/1962 |

* cited by examiner

*Primary Examiner*—Edward K. Look
*Assistant Examiner*—Devin Hanan
(74) *Attorney, Agent, or Firm*—Michael J. Striker

(57) ABSTRACT

In a radial fan wheel for supplying cooling air for an electrical machine, with a number of fan blades (16) attached along the circumference of the fan wheel (10) that have arc-shaped blade ends (18), which, at their radially inner edge, enclose a first angle ($\beta 1$) with a tangent (20) to the inner circumference (20) of the fan wheel (10) and at their radially outer edge, enclose a second angle ($\beta 2$) with a tangent (22) to the outer circumference (24) of the fan wheel (10), the invention proposes that the second angle ($\beta 2$) be selected to be 75% or more greater than the first angle ($\beta 1$) in order to minimize the turbulence noise in the vicinity of the fan blades (16) during operation of the fan wheel (10).

9 Claims, 3 Drawing Sheets

RADIAL FAN WHEEL FOR TRANSPORTING COOLING AIR FOR AN ELECTRIC MACHINE

BACKGROUND OF THE INVENTION

The current invention relates to a radial fan wheel for supplying cooling air for an electrical machine, with a number of fan blades attached along the circumference of the fan wheel that have arc-shaped blade ends, which, at their radially inner edge, enclose a first angle with a tangent to the inner circumference of the fan wheel and at their radially outer edge, enclose a second angle with a tangent to the outer circumference of the fan wheel.

In sheet metal fans, which are usually embodied as radial fans and are for supplying cooling air for electrical machines, reducing noise during operation is a continuous concern. When supplying the cooling air, among other things the turbulence noise in the vicinity of the fan blades plays a large role in the overall noise production of the fan.

In a generator, the flow of cooling air is intensely disturbed in the vicinity of the fan. The most important components that produce the turbulence are the struts and ribs of the end plate, the surface of the end plate on the side oriented toward the fan, heat sinks, and interconnection plates on the B-side of the end windings.

Important geometric parameters for the fan blades are the entry angle $\beta 1$ and the exit angle $\beta 2$ of the blade ends. FIG. 4 illustrates the definition of the entry angle $\beta 1$ and exit angle $\beta 2$ for arc-shaped blade ends 18. The entry angle $\beta 1$ is defined as the angle between the radially inner edge of the blade end 18 and a tangent 22 to the inner circumference 20 of the fan wheel. The exit angle $\beta 2$ is defined as the angle between the radially outer edge of the blade end 18 and a tangent 26 to the outer circumference 24 of the fan wheel. Knowing these two angles provides an unambiguous definition of an arc-shaped blade end 18 of a fan blade 16.

SUMMARY OF THE INVENTION

The device according to the invention, is based on the prior art by selecting the second angle $\beta 2$ to be more than 75% greater than the first angle $\beta 1$ in order to minimize turbulence noise in the vicinity of the fan blades during operation of the fan wheel. The invention is thus based on the concept of reducing the turbulence noise by improving the fluid dynamics efficiency of the fan. To this end, the angles $\beta 1$ and $\beta 2$ are selected so that the specific noise of the fan is minimal. The term specific noise refers to the fan noise in relation to the cooling air flow rate.

Providing that the first angle ($\beta 1$) is selected to be between 25° and 35° and the second angle ($\beta 2$) is selected to be between 45° and 70° or if the first angle ($\beta 1$) is selected to be between 5° and 15° and the second angle ($\beta 2$) is selected to be between 75° and 85° make it possible to achieve particularly low values for the specific fan noise.

The values for the entry angle and exit angle have turned out to be particularly advantageous.

The selected spacing of the fan blades within each blade sector offers the advantage that tonal noise that is unpleasant to the human ear is further reduced to a considerable degree.

In a simple and efficient manner, a further feature of the present invention makes it possible for the amplitude spectrum of the fan wheel to have a minimum at the order that corresponds to the number of blades. This achieves a favorable behavior with regard to noise production.

It has also turned out that the degree of irregularity is an important influence parameter for the noise behavior of the fan wheel, the values in the preferred range contributing to a particularly favorable tonal behavior.

The embodiment of the fan wheel covers commonly used fan wheel designs in which the embodiment according to the invention is particularly advantageous.

In a fan comprised of a stamped and bent component, since the number of blades and the degree of irregularity are limited for manufacturing reasons, the embodiment according to the invention plays a particularly important role in the fan wheels.

BRIEF DESCRIPTION OF THE DRAWINGS

The invention will be explained in more detail below in conjunction with the accompanying drawings.

DETAILED DESCRIPTION OF THE PREFERRED EMBODIMENTS

Figure 1:
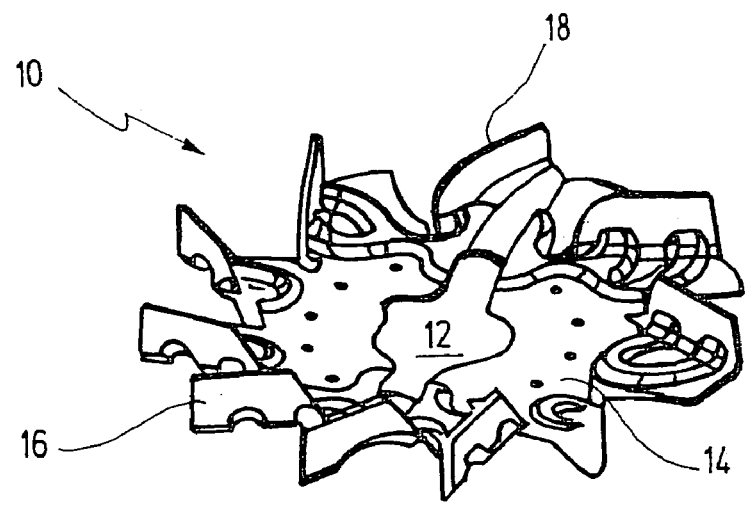
FIG. 1 is a schematic, perspective view of a radial fan wheel according to an exemplary embodiment of the invention.
Figure 2:
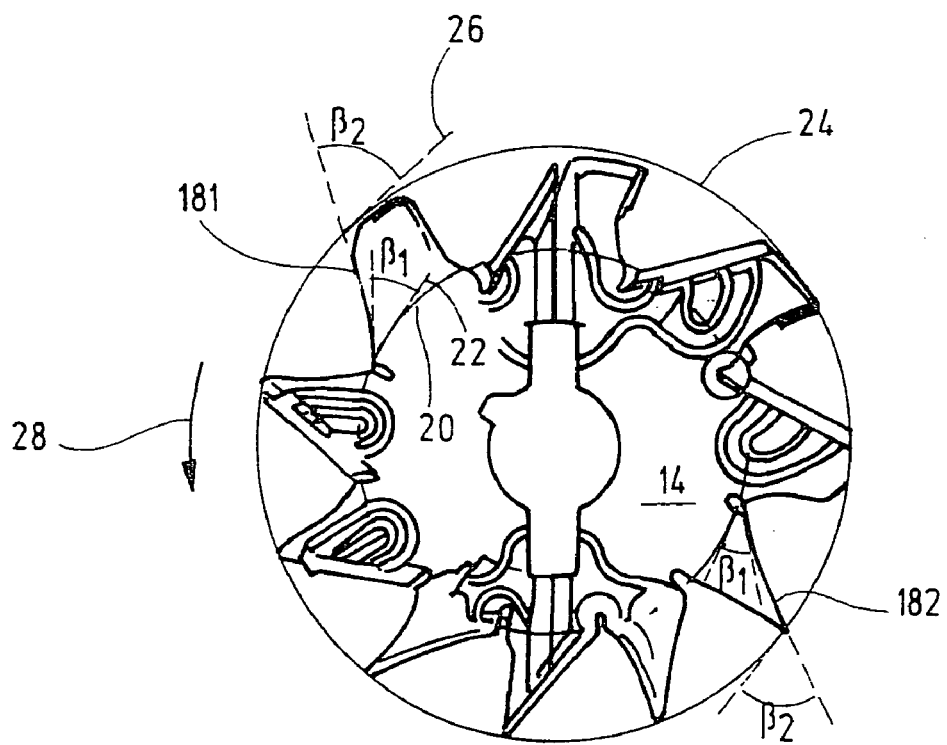
FIG. 2 is a view of the fan wheel shown in FIG. 1.

FIG. 1 is a perspective depiction of a radial fan wheel labeled as a whole with the reference numeral 10 and FIG. 2 shows a view of the fan wheel 10 from FIG. 1.

The fan wheel 10 is comprised of a stamped and bent component made of sheet metal. For example, it can be driven in an intrinsically known manner by an electric motor, not shown, and to this end, has a central opening 12 for fastening to a machine shaft, not shown.

A disk part 14 that contains the central opening 12 has outward pointing fan blades 16 attached radially along its circumference, with blade ends 18 oriented in the axial direction. Perpendicular to the axial direction, the blade ends 18 extend in an essentially arc-shaped fashion between the inner circumference 20 and the outer circumference 24 of the fan wheel.

FIGS. 1 and 2 show an exemplary embodiment of a radial fan with N=10 fan blades. As explained in more detail below, the fan blades 16 are disposed at irregular distances along the circumference of the fan wheel in order to further reduce the fan noise during operation. Two different fan blades are depicted in a simplified fashion in terms of their structure in FIG. 2 in order to make the entry angle $\beta 1$ and the exit angle $\beta 2$ of the blade ends 181 and 182 more clearly visible. The arrow 28 indicates the rotation direction of the fan wheel during operation.

The following angle ranges for the entry angle $\beta 1$ and the exit angle $\beta 2$ have turned out to be particularly favorable in terms of noise production:

$$\beta 1 = 25° \ldots 35° \text{ and } \beta 2 = 45° \ldots 70° \quad \text{(A)}$$

and $$\beta 1 = 5° \ldots 15° \text{ and } \beta 2 = 75° \ldots 85° \quad \text{(B)}$$

Figure 3:
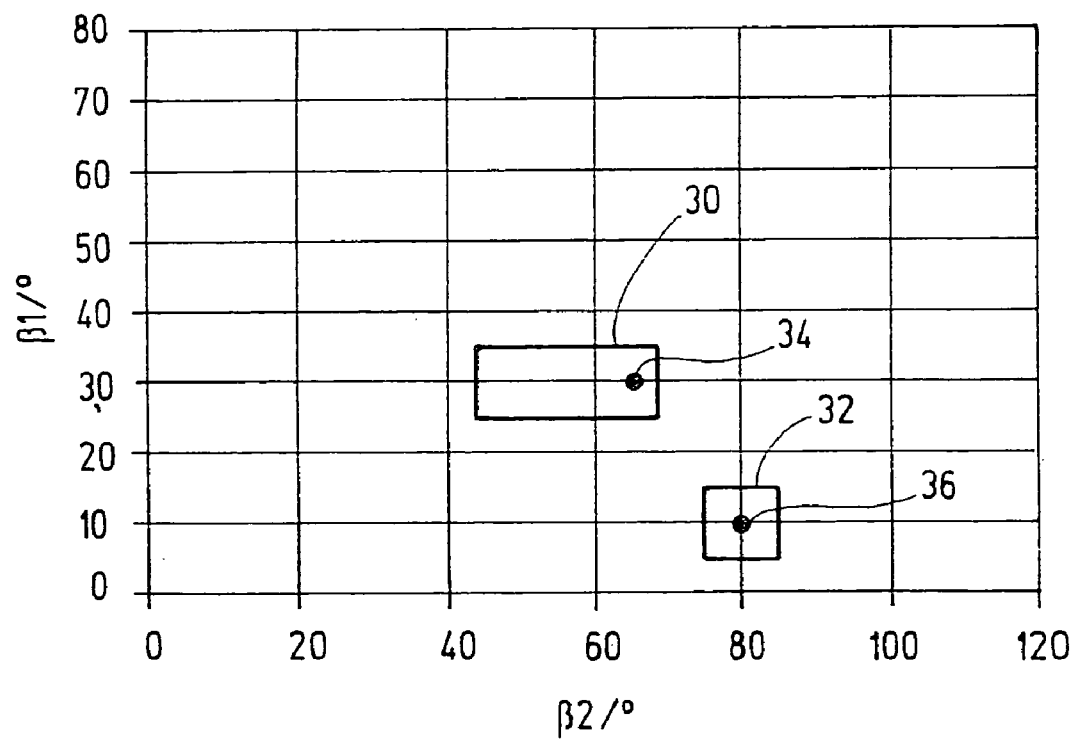
FIG. 3 is an angle graph for depicting the angular ranges for the entry angle $\beta 1$ and the exit angle $\beta 2$ according to the invention.
Figure 4:
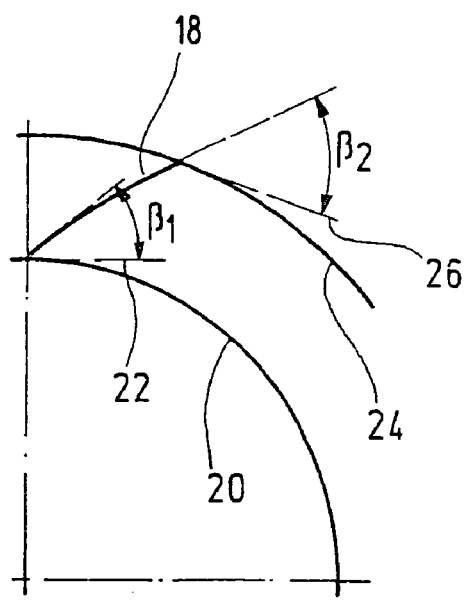
FIG. 4 is a graph to illustrate the definition of the entry angle $\beta 1$ and exit angle $\beta 2$ in an arc-shaped blade end.

The two ranges are indicated by the reference numeral 30 (range A) and the reference numeral 32 (range B) in the angle graph in FIG. 3.

Figure 5A:
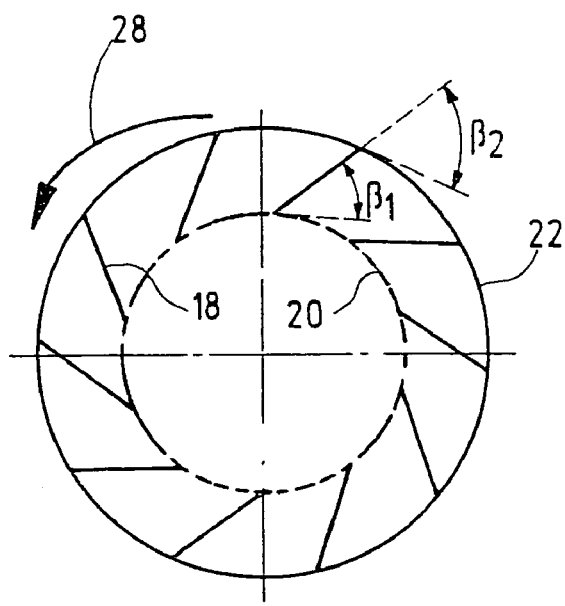
FIGS. 5a and 5b give schematic depictions of two embodiments of a fan wheel that are particularly preferable according to the invention.

Particularly good results were achieved in trials with a fan wheel that had an entry angle β1=30 ° and an exit angle β2=65 °. This angle combination is labeled with the reference numeral 34 in FIG. 3. FIG. 5a is a schematic depiction of a correspondingly embodied fan wheel in which only the blade ends 18 are shown.

A different fan wheel that had an entry angle β1=10° and an exit angle β2=80° also made it possible to achieve particularly good results. The angle combination of this fan wheel is labeled with the reference numeral 36 in FIG. 3 and is schematically depicted in FIG. 5b.

Figure 6:
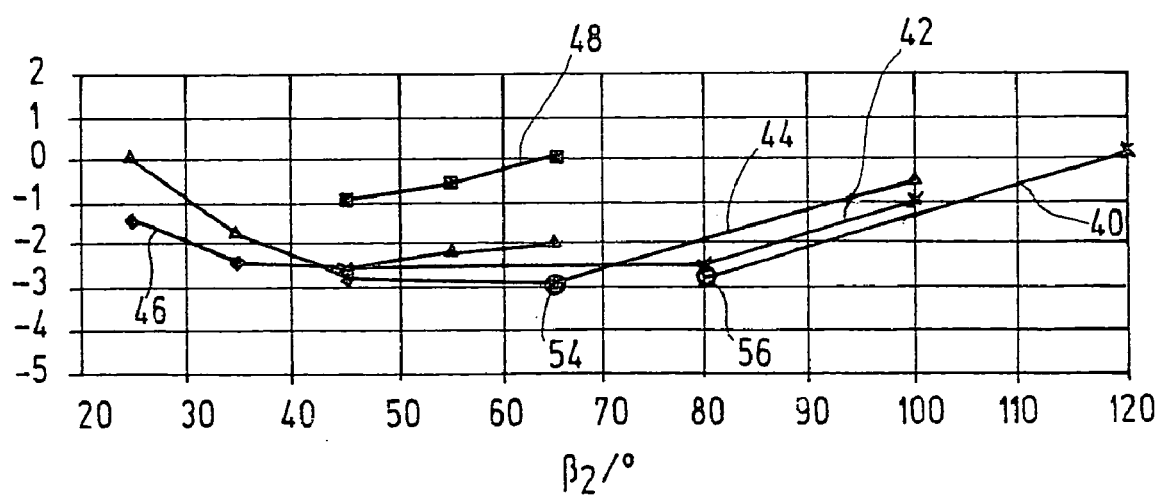
FIG. 6 is a graph that shows the specific fan noise in comparison to a reference fan for a series of different entry angles $\beta 1$, plotted as a function of the exit angle $\beta 2$.

FIG. 6 is a graph that plots measurement results for the specific fan noise in comparison to the noise production of a reference fan (ordinate equals zero). The graph depicts, as a function of the exit angle β2, measurement curves for an entry angle of β1=10° (reference numeral 40), β1=20° (reference numeral 42), β1=30° (reference numeral 44), β1=50° (reference numeral 46), and β1=70° (reference numeral 48). It is clear that the above-mentioned ranges for the entry angle and exit angle are each associated with a sharp noise reduction in comparison to the reference fan.

Figure 5B:
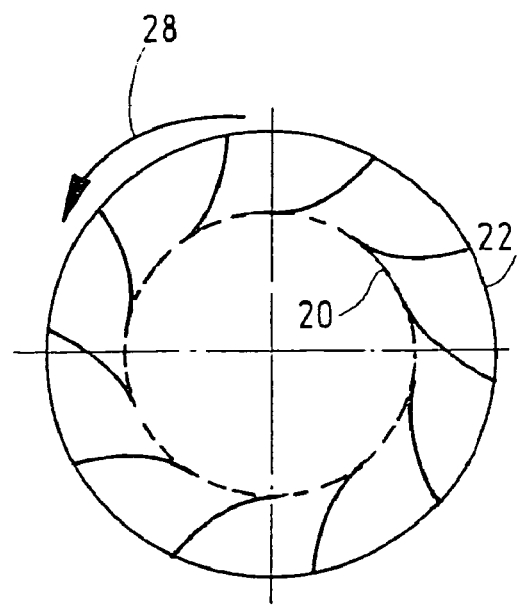

The measurement points for the exemplary embodiments in FIG. 5a with β1=30° and β2=65° and in FIG. 5b with β1=10° and β2=80°, which turned out to be particularly favorable in terms of noise, are labeled in the graph in FIG. 6 with the reference numerals 54 and 56.

Aside from the geometric embodiment of the blade ends, in the exemplary embodiment shown in FIGS. 1 and 2, further noise reduction is achieved by dividing the fan blades 16 into three sectors in which the blade spacings of the distances between adjacent blades 16 are equivalent to one another. The angular distances in different sectors, however, differ from one another. A first sector contains four fan blades 16 that are spaced apart from one another by an angular distance of tmax=43.2°, a second sector also contains four fan blades 16 that are spaced apart from one another by an angular distance of tmin=28.8°, and a third sector contains two fan blades 16 that are spaced apart from each other by an average angular distance of tavg=36°.

Due to the irregular spacing of the fan blades, the acoustic power generated by the fan is spread out over different frequencies, i.e. over different orders in the amplitude spectrum. The more irregularly the fan blades are distributed along the circumference, the broader the frequency range of the fan noise over which the acoustic power of the fan wheel is spread.

Although in general, the fan noise is found to be more pleasant with a greater degree of irregularity, a degree of irregularity that is not equal to zero does not automatically result in a more favorable fan noise. The degree of irregularity u here is defined by the equation:

$$u=(tmax-tmin)/tavg$$

With the angular distances indicated above, the degree of irregularity of the fan wheel from FIG. 2 is u=0.4. Such a value for the degree of irregularity contributes to a particularly favorable tonal behavior of the fan wheel. In particular, with this fan wheel, there is a pronounced minimum in the amplitude spectrum at the order of the number of blades, here the 10$^{th}$ order, which, according to current understanding, results in a particularly advantageous noise behavior of the fan wheel.

Although the invention has been shown and described in particular with reference to some preferred exemplary embodiments, it is evident to one skilled in the art that modifications with regard to design and details can be made without venturing beyond the scope of the invention. Accordingly, the disclosure of the current invention should not be viewed as limiting. Rather, the disclosure of the current invention is intended to illustrate the scope of the invention that is set forth in the following claims.

The invention claimed is:

1. A radial fan wheel for supplying cooling air for an electrical machine, comprising:
 a number of fan blades (16) attached along the circumference of the fan wheel (10) that have arc-shaped blade ends (18), which, at their radially inner edge, enclose a first angle (β1) with a tangent (22) to the inner circumference (20) of the fan wheel (10) and at their radially outer edge, enclose a second angle (β2) with a tangent (26) to the outer circumference (24) of the fan wheel (10), wherein the second angle (β2) is selected to be more than 75% greater than the first angle (β1) in order to minimize the turbulence noise in the vicinity of the fan blades (16) during operation of the fan wheel (10), wherein the fan blades (16) are divided into exactly three blade sectors, wherein the angular distances between adjacent fan blades (16) in a first blade sector have the maximal distance (tmax), wherein the angular distances between adjacent fan blades (16) in a second blade sector have the minimal distance (tmin), wherein the angular distances between adjacent fan blades (16) in a third blade sector have an average distance (tavg) that corresponds to half the sum of the maximal distance (tmax) and the minimal distance (tmin), wherein the numbers of fan blades (16) in the first and second blade sectors are equal, and wherein the values for the maximal distance (tmax) and the minimal distance (tmin) are selected so that the degree of irregularity $$u=2*(tmax-tmin)/(tmax+tmin)$$

is between 0.35 and 0.55.

2. The radial fan wheel according to claim 1, wherein the first angle (β1) is selected to be between 25° and 35° and the second angle (β2) is selected to be between 45° and 70°.

3. The radial fan wheel according to claim 2, wherein the first angle (β1) is approximately 30° and the second angle (β2) is approximately 65°.

4. The radial fan wheel according to claim 1, wherein the first angle (β1) is selected to be between 5° and 15° and the second angle (β2) is selected to be between 75° and 85°.

5. The radial fan wheel according to claim 4, wherein the first angle (β1) is approximately 10° and the second angle (β2) is approximately 80°.

6. The radial fan wheel according to claim 1, wherein the fan wheel (10) has nine to twelve fan blades.

7. The radial fan wheel according to claim 1, wherein the fan wheel (10) is a stamped and bent component made of sheet metal.

8. The radial fan wheel according to claim 1, wherein the values for the maximal distance (tmax) and the minimal distance (tmin) are selected so that the degree of irregularity $$u=2*(tmax-tmin)/(tmax+tmin)$$

is approximately 0.4.

9. The radial fan wheel according to claim 1, wherein the fan wheel (10) has ten fan blades.

* * * * *